(12) United States Patent
Ebihara (10) Patent No.: US 7,684,072 B2
(45) Date of Patent: Mar. 23, 2010

(54) IMAGE FORMING APPARATUS AND METHOD FOR CHANGING PRINT PRIORITIES

(75) Inventor: Hideyuki Ebihara, Shizuoka-ken (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 1392 days.

(21) Appl. No.: 11/094,298

(22) Filed: Mar. 31, 2005

(65) Prior Publication Data
US 2006/0227360 A1  Oct. 12, 2006

(51) Int. Cl.
  *G06F 3/12* (2006.01)
(52) U.S. Cl. .................... 358/1.15; 718/103
(58) Field of Classification Search ............. 399/82; 358/1.1–1.9, 1.11–1.18; 718/103
See application file for complete search history.

(56) References Cited

U.S. PATENT DOCUMENTS

| | | | |
|---|---|---|---|
| 6,883,038 B2* | 4/2005 | Christodoulou et al. ....... 710/5 |
| 6,987,578 B2* | 1/2006 | Alexander ............... 358/1.15 |
| 7,158,257 B2* | 1/2007 | Hosoda ................ 358/1.15 |
| 2003/0011811 A1* | 1/2003 | Clough ................ 358/1.15 |
| 2003/0103777 A1* | 6/2003 | Nakamura et al. .......... 399/82 |

FOREIGN PATENT DOCUMENTS

| | | | |
|---|---|---|---|
| JP | 05162415 A | * | 6/1993 |
| JP | 08-016332 A | | 1/1996 |
| JP | 2000-312270 A | | 11/2000 |

* cited by examiner

*Primary Examiner*—Mark K Zimmerman
*Assistant Examiner*—Lennin R Rodriguez
(74) *Attorney, Agent, or Firm*—Foley & Lardner LLP (57) ABSTRACT

A method and apparatus of providing a level of priority for printing a document in a company having a plurality of departments, which includes receiving a print job for printing at least one document. A department is determined from the plurality of departments which sent the print job, and a priority is assigned to the print job based on the determined department. After the print job has been printed, a print amount is determined from the determined department during a fixed time interval. The priority assigned to the determined department is lowered if the print amount exceeds a threshold value.

16 Claims, 7 Drawing Sheets

| No | Name | Code | Pri | PriOld | TotalCount | [0] | [1] | [2] | -- | [D] |
|---|---|---|---|---|---|---|---|---|---|---|
| 1 | IS | 12345 | 4 | 4 | 6512 | 22 | 21 | 20 | | 22 |
| 2 | GA | 23456 | 2 | 2 | 1535 | 20 | 10 | 11 | | 15 |
| 3 | Acct | 34567 | 1 | 1 | 68313 | 23 | 21 | 22 | | 25 |
| 4 | Design1 | 45678 | 3 | 3 | 532 | 35 | 30 | 31 | | 35 |
| 5 | Design2 | 56789 | 5 | 5 | 3158 | 25 | 26 | 22 | | 27 |
| | | | | | | | | | | |
| N | DesignS | 99999 | N | N | 16836 | 12 | 18 | 22 | | 13 |

FIG. 7

| No | JobName | Code | Pages | Setting |
|---|---|---|---|---|
| 1 | Test1 | 12345 | 5 | Staple |
| 2 | Test2 | 56789 | 2 | Duplex |
| 3 | Test3 | 45678 | 10 | Staple |
| 4 | Test4 | 99999 | 3 | Punch |
| 5 | Test5 | 56789 | 7 | Staple |

FIG. 8

| No | Name | Code | Pri | PriOld | TotalCount | [0] | [1] | [2] | -- | [D] |
|---|---|---|---|---|---|---|---|---|---|---|
| 1 | IS | 12345 | 4 | 4 | 6512 | 22 | 21 | 20 | | 22 |
| 2 | GA | 23456 | 2 | 2 | 1535 | 20 | 10 | 11 | | 15 |
| 3 | Acct | 34567 | 1 | 1 | 68313 | 23 | 21 | 22 | | 25 |
| 4 | Design1 | 45678 | 3 | 3 | 542 | 45 | 30 | 31 | | 35 |
| 5 | Design2 | 56789 | 5 | 5 | 3158 | 25 | 26 | 22 | | 27 |
| | | | | | | | | | | |
| N | DesignS | 99999 | N | N | 16836 | 12 | 18 | 22 | | 13 |

FIG. 9

| No | Name | Code | Pri | PriOld | TotalCount | [0] | [1] | [2] | -- | [D] |
|---|---|---|---|---|---|---|---|---|---|---|
| 1 | IS | 12345 | 3 | 3 | 6512 | 22 | 21 | 20 | | 22 |
| 2 | GA | 23456 | 2 | 2 | 1535 | 20 | 10 | 11 | | 15 |
| 3 | Acct | 34567 | 1 | 1 | 68313 | 23 | 21 | 22 | | 25 |
| 4 | Design1 | 45678 | 4 | 3 | 542 | 45 | 30 | 31 | | 35 |
| 5 | Design2 | 56789 | 5 | 5 | 3158 | 25 | 26 | 22 | | 27 |
| | | | | | | | | | | |
| N | DesignS | 99999 | N | N | 16836 | 12 | 18 | 22 | | 13 |

FIG. 10

| No | Name | Code | Pri | PriOld | TotalCount | [0] | [1] | [2] | -- | [D] |
|---|---|---|---|---|---|---|---|---|---|---|
| 1 | IS | 12345 | 3 | 3 | 6512 | 22 | 21 | 20 | | 22 |
| 2 | GA | 23456 | 2 | 2 | 1535 | 20 | 10 | 11 | | 15 |
| 3 | Acct | 34567 | 1 | 1 | 68313 | 23 | 21 | 22 | | 25 |
| 4 | Design1 | 45678 | 4 | 4 | 542 | 45 | 30 | 31 | | 35 |
| 5 | Design2 | 56789 | 5 | 5 | 3158 | 25 | 26 | 22 | | 27 |
| | | | | | | | | | | |
| N | DesignS | 99999 | N | N | 16836 | 12 | 18 | 22 | | 13 |

FIG. 11

| No | Name | Code | Pri | PriOld | TotalCount | [0] | [1] | [2] | -- | [D] |
|---|---|---|---|---|---|---|---|---|---|---|
| 1 | IS | 12345 | 3 | 3 | 6512 | 22 | 22 | 21 | | 11 |
| 2 | GA | 23456 | 2 | 2 | 1535 | 20 | 20 | 10 | | 12 |
| 3 | Acct | 34567 | 1 | 1 | 68313 | 23 | 23 | 21 | | 15 |
| 4 | Design1 | 45678 | 4 | 4 | 542 | 45 | 45 | 30 | | 14 |
| 5 | Design2 | 56789 | 5 | 5 | 3158 | 25 | 25 | 26 | | 13 |
| | | | | | | | | | | |
| N | DesignS | 99999 | N | N | 16836 | 12 | 12 | 18 | | 10 |

FIG. 12

| No | Name | Code | Pri | PriOld | TotalCount | [0] | [1] | [2] | -- | [D] |
|---|---|---|---|---|---|---|---|---|---|---|
| 1 | IS | 12345 | 3 | 3 | 6512 | 0 | 22 | 21 | | 11 |
| 2 | GA | 23456 | 2 | 2 | 1535 | 0 | 20 | 10 | | 12 |
| 3 | Acct | 34567 | 1 | 1 | 68313 | 0 | 23 | 21 | | 15 |
| 4 | Design1 | 45678 | 4 | 4 | 542 | 0 | 45 | 30 | | 14 |
| 5 | Design2 | 56789 | 5 | 5 | 3158 | 0 | 25 | 26 | | 13 |
| | | | | | | | | | | |
| N | DesignS | 99999 | N | N | 16836 | 0 | 12 | 18 | | 10 |

IMAGE FORMING APPARATUS AND METHOD FOR CHANGING PRINT PRIORITIES

FIELD OF THE INVENTION

The present invention relates generally to a multi-function peripheral (MFP) or printer and a method for changing a print priority, more particularly, to an apparatus and method of changing a print priority for departments of a company using an MFP or printer.

BACKGROUND OF THE INVENTION

In a conventional printer, multi-function peripheral (MFP), or image forming apparatus (hereinafter, for ease, collectively referred to as "printer"), the priority for a print job is decided based on the department that issued the print job, and each print job is processed according to the priority. The priority is fixed in advance for each department. Accordingly, if a department with a higher priority executes a lot of print jobs, a department with a lower priority may not be able to get any or all of its print jobs completed.

Accordingly, there exists a desire to provide a system or method that adjusts the print processing to ensure that the print jobs of each department are executed.

SUMMARY OF THE INVENTION

According to an aspect of the invention, there is provided a method of providing a level of priority for printing a document in a company having a plurality of departments. The method includes receiving a print job for printing at least one document. The method further includes determining a department from the plurality of departments which sent the print job, and assigning a priority to the print job based on the determined department. The method still further includes, after the print job has been printed, determining a print amount from the determined department during a fixed time interval. The method also includes lowering the priority assigned to the determined department if the print amount exceeds a threshold value.

According to another aspect of the invention, there is provided a system for printing documents. The system includes a receiving unit configured to receive a print job for printing at least one document. The system further includes a determining unit configured to determine a department from the plurality of departments which sent the print job, and to assign a priority to the print job based on the determined department. The system still further includes a control unit configured to determine, after the print job has been printed, a print amount from the determined department during a fixed time interval. The control unit is configured to lower the priority assigned to the determined department if the print amount exceeds a threshold value.

According to yet another aspect of the invention, there is provided a program product for printing a document, the program product comprising machine-readable program code for causing, when executed, one or more machines to perform the following method steps: a) receiving a print job for printing at least one document; b) determining a department from the plurality of departments which sent the print job, and assigning a priority to the print job based on the determined department; c) after the print job has been printed, determining a print amount from the determined department during a fixed time interval; d) and lowering the priority assigned to the determined department if the print amount exceeds a threshold value.

Further features, aspects and advantages of the present invention will become apparent from the detailed description of preferred embodiments that follows, when considered together with the accompanying figures.

DETAILED DESCRIPTION OF THE PREFERRED EMBODIMENTS

Various embodiments of the invention will be described below, in detail, with reference to the accompanying drawings.

According to at least one embodiment of the invention, the printed number of sheets by each department is counted for a certain period of time, and if the printed number of sheets exceeds a predetermined number for at least one department, the priority of that department is exchanged with a department of lower priority. In this manner, if a department with a higher priority executes a lot of print jobs in a relatively short period of time, the priority of that department will be automatically lowered, which allows for the execution of print jobs by departments having a lower priority.

Figure 1:
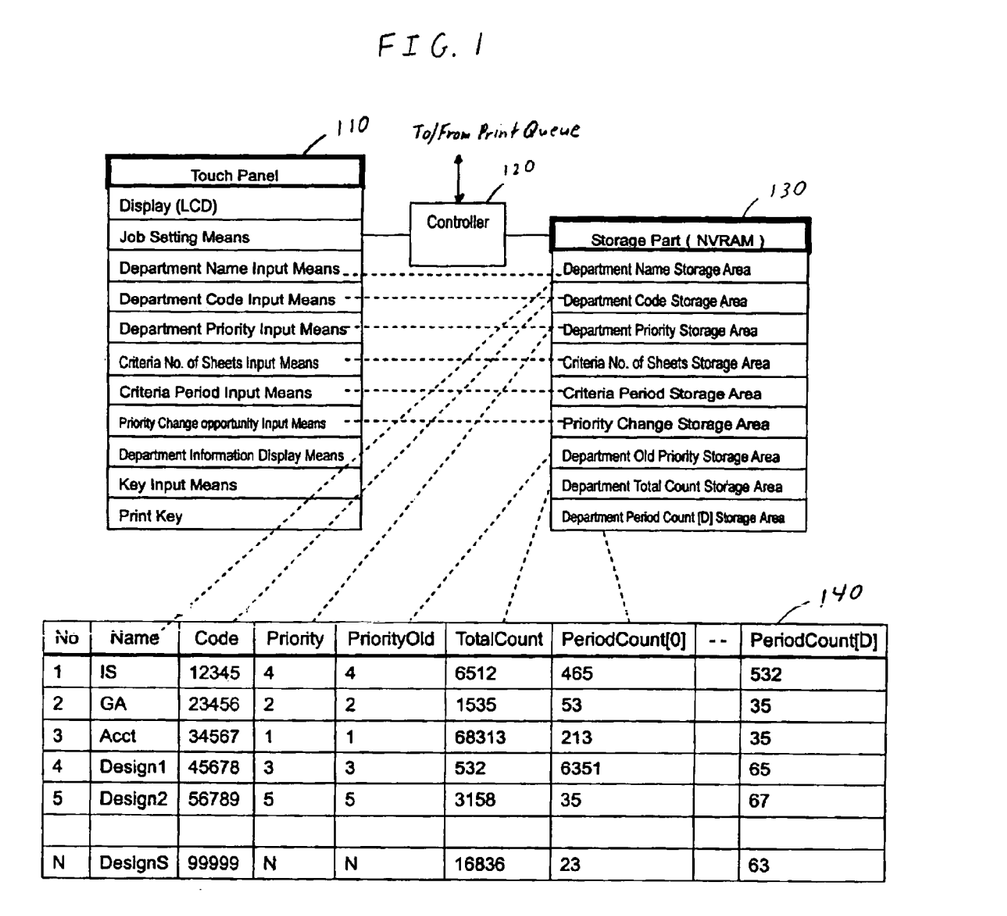
FIG. 1 is a diagram showing components for controlling an image forming apparatus according to a first embodiment of the invention.

FIG. 1 shows components of an apparatus for controlling an image processing device that are utilized in accordance with a first embodiment of the invention. As shown in FIG. 1, the apparatus includes a touch panel 110, a controller 120, and a storage part 130. In a preferred implementation of the first embodiment, the storage part 130 is a non-volatile random access memory (NVRAM), but one of ordinary skill in the art will recognize that other types of read/write storage devices (e.g., RAM, DRAM, SDRAM) may be utilized, while remaining within the spirit and scope of the present invention.

The storage part 130 stores a department management table 140 having a first column for department number ('no.'), a second column for department name ('name'), a third column for department code, ('code') a fourth column for department current priority ('priority'), a fifth column for department previous priority ('priorityold'), a sixth column for total count of printed sheets ('totalcount'), and a plurality of columns for respectively storing period counts ('periodcount[0]-[D]') for 0-D criteria periods.

The touch panel 110 is preferably provided on a printer (which may be a printer, MFP, or other type of image forming apparatus) at a conspicuous location (e.g., top panel of the printer), so that a user can readily enter settings by way of the touch panel 110. The touch panel 110 may be implemented as a liquid crystal display (LCD), for example. The touch panel 110 includes a job setting, a department name input, a department code input, a department priority input, a criteria number of sheets input, a criteria period input, a priority change opportunity input, a department information display, a key input, and a print key. The functionality of the touch panel 110 will be described in more detail below.

The department name input, the department code input, the department priority input, the criteria number of sheets input, the criteria period input, and the priority change opportunity input are inputs that preferably can only be made by someone with a high-level priority. For example, the person can enter in a particular code via the touch panel 110 to be able to enter in the pertinent information for providing a print priority scheme in accordance with the several embodiments of the invention. Such a person may be a system administrator or someone with an appropriate level of authority, for example.

The department names entered by way of the department name input of the touch panel 110 are stored in a department name storage area of the storage part 130. The department codes entered by way of the department code input of the touch panel 110 are stored in a department code storage area of the storage part 130. The department priority levels entered by way of the department priority input of the touch panel 110 are stored in a department priority storage area of the storage part 130. The criteria number of sheets value entered by way of the criteria number of sheets input of the touch panel 110 is stored in a criteria number of sheets storage area of the storage part 130. A criteria period entered by way of the criteria period input of the touch panel 110 is stored in the criteria period storage area of the storage part 130. The priority change opportunity time period entered by way of the priority change opportunity input of the touch panel 110 is stored in the priority change storage area of the storage part 130.

The second column of the department management table 140 corresponds to department names obtained from the department name storage area. Preferably, each department name is a name chosen to readily identify that department (e.g., Accounting Department, Systems Engineering Department, Intellectual Property Department). The third column of the department management table 140 corresponds to department codes obtained from the department code storage area. Each department code operates as a password for identifying a particular department. The fourth column of the department management table 140 corresponds to priority levels obtained from the department priority storage area. According to these priority levels, the order of print jobs is determined out of a plurality of print jobs that are awaiting to be printed. The fifth column of the department management table 140 corresponds to old priority levels (most recent priority level with respect to the current priority level) obtained from the department old priority storage area of the storage part 130. The sixth column of the department management table 140 correspond to total count values obtained from the department total count storage area of the storage part 130. The total count values correspond to the sum total of values in the seventh through (seven+D)$^{th}$ columns of the department management table 140. The seventh through (seven+D)$^{th}$ columns of the department management table store period count values for respective zero through D$^{th}$ count periods, as obtained from the department period count [D] storage area of the storage part 130. These columns provide a history of the counter for the last D criteria periods for each department.

The controller 120 receives inputs from the touch panel 110, and obtains data from the storage part 130. The controller 120 controls operation of an image forming apparatus in accordance with the various embodiments of the invention. The controller 120 may be connected to the image forming apparatus through a wireless or wired connection (e.g., network connection).

The value entered by way of the criteria number of sheets input corresponds to the reference number of sheets that is referred to when a changing priority determination is made. It is an integer value, such as 10,000, 20,000, etc. The criteria period entered by way of the criteria period input is the time period subject for the criteria number of sheets value. For example, it may be set equal to one day, two days, one week, one month, etc. The priority change is a time for which a priority determination is made, such as per every job, once a day, once every two days, once per month, etc. Thus, if the criteria number of sheets is equal to 10,000, the criteria period is equal to two days, and if the priority change value is equal to one day, then a determination is made every day as to whether or not a department has printed out 10,000 or more sheets over a time period corresponding to the current day and the most recent day (yesterday), and if so, that department's priority is lowered.

Figure 2:
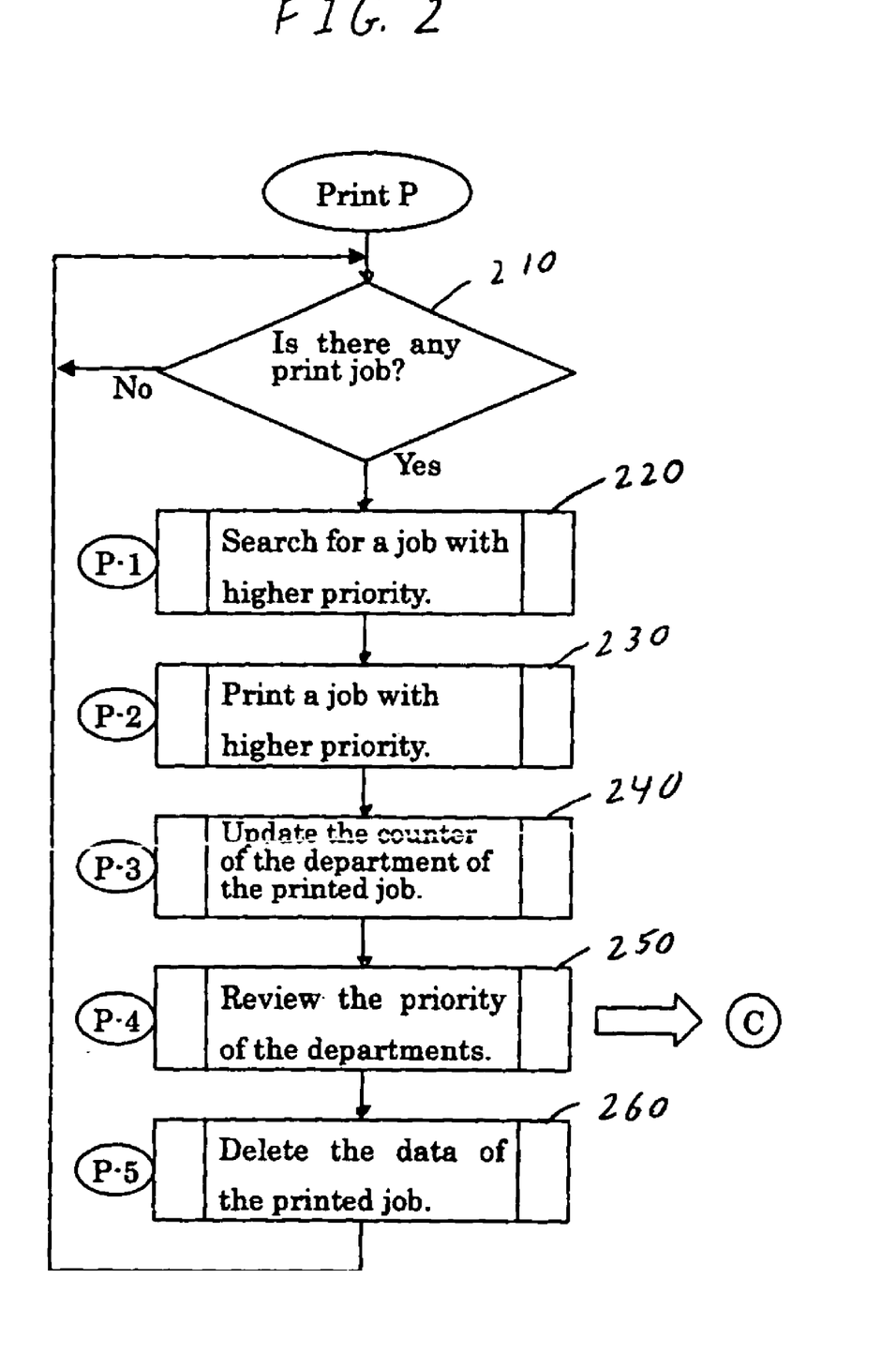
FIG. 2 is a flow diagram of a print processing method that can be used in accordance with the image forming apparatus of the first embodiment.

FIG. 2 is a flow diagram of a print processing method that can be utilized with an image forming apparatus in accordance with the first embodiment of the invention. First, a determination is made as to whether or not there are any print jobs (step 210). If No, then the process returns to step 210. If Yes, then a search is made for the print job with the highest priority (step 220). In particular, a search is made from the current print jobs for a department with the highest priority in the department management table 140 by using the print job department code for each of the current print jobs. A selection is made of the print job having the department with the highest priority.

The print job of the department with the highest priority of the current print jobs is printed (step 230). In addition, an update is performed of the counter of the department of the print job having the highest priority (step 240). In particular, the counter for Period Count[0] and the Total Count counter are increased by a value corresponding to the number of pages in the print job that was just printed.

Figure 3:
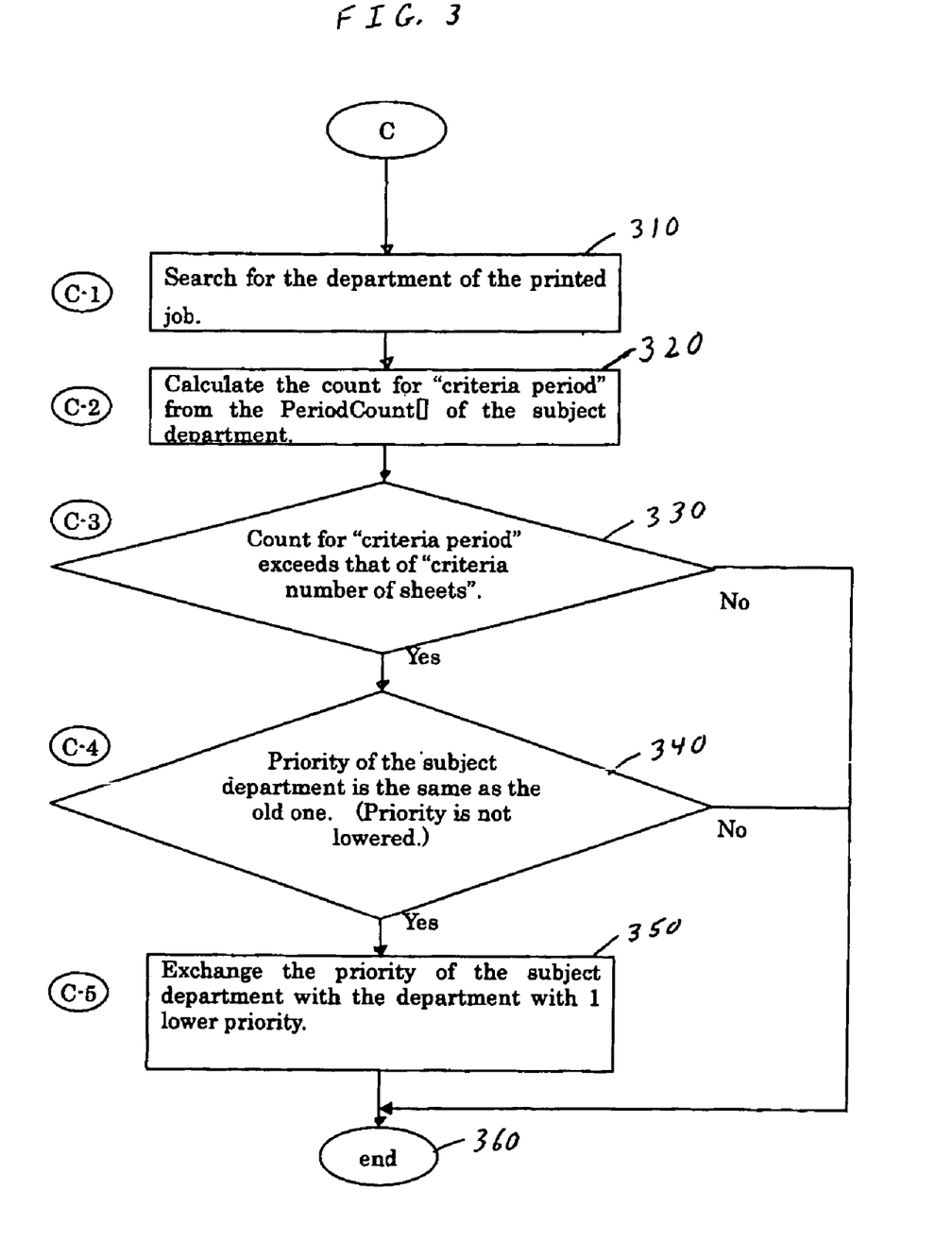
FIG. 3 is a flow diagram of a priority determination method that can be used in accordance with the image forming apparatus of the first embodiment.

Further, a review of the priority of all of the departments is made (step 250), with reference to FIG. 3. Lastly, the data of the printed job is deleted (step 260), and the process returns to step 210 to process any remaining print jobs.

As discussed above, FIG. 3 corresponds to the process performed for a review of the priority of all of the departments in accordance with an embodiment of the invention. First, a search is made for the department of the printed job (step 310). A calculation of the count for the current criteria period is performed using information obtained from the Department PeriodCount[ ] storage area of the storage part 130 (step 320). A determination is made of whether or not the count for the current criteria period exceeds that of the "criteria number of sheets" (step 330). The criteria number of sheets can be obtained from the criteria number of sheets storage area for the department that sent the printed job. If No, then the process ends (step 360). If Yes, then it is determined whether or not the priority of the subject department is the same as the old one (step 340). The determination is made by comparing the "priority" column to the "priority old" column in the department management table for the subject department. If they are not the same, then the process ends (step 360). If they are the same, then an exchange is performed of the priority of the subject department with the department having a priority level one level lower than the subject department (step 350). After the exchange is performed, the process ends (step 360).

Figure 4:
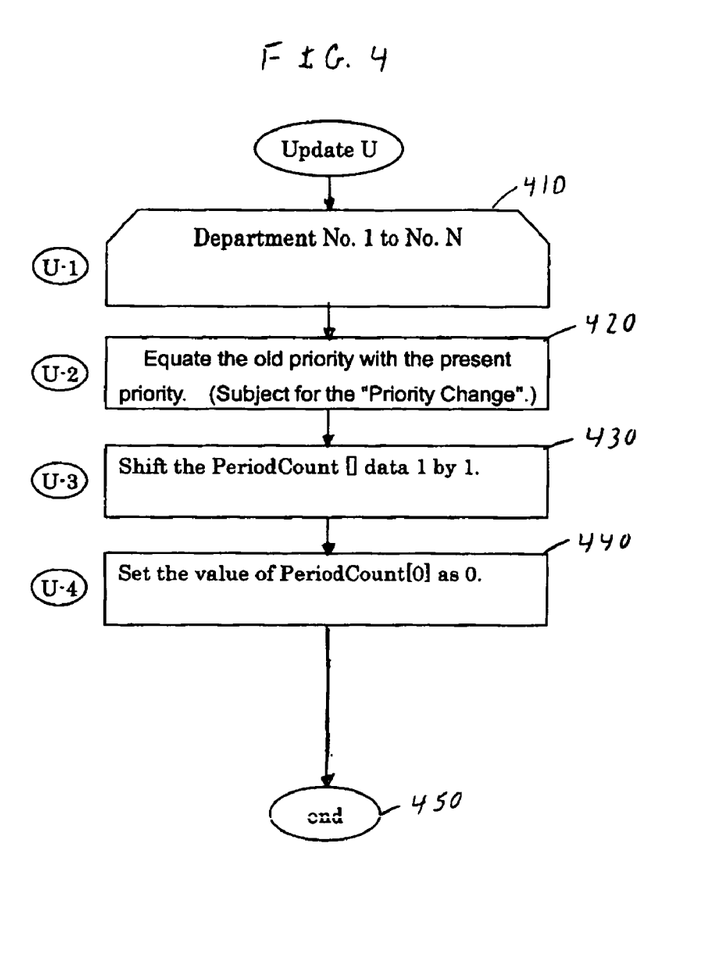
FIG. 4 is a flow diagram of a priority change opportunity process that can be used in accordance with the image forming apparatus of the first embodiment.

FIG. 4 shows the steps involved in a department information update process. The update process is preferably performed at every priority change opportunity. First, the process performs an update for each department, Department #1 to Department #N (step 410). The old priority value is set equal to the current priority value for each department (step 420). In addition, the PeriodCount[ ] data is shifted by one column (step 430). For example, data in the column PeriodCount[0] of the Department Management Table 140 gets shifted to the column PeriodCount[1] of the Department Management Table 140, . . . , and data in the column PeriodCount[D−1] gets shifted to the column PeriodCount[D] in the Department Management Table 140. The data that was previously in the column PeriodCount[D] is no longer stored in the Department Management Table 140. The value of PeriodCount[0] is set equal to 0 (zero) for all departments 1 through N (step 440). The department information update process then ends (step 450).

Figure 5:
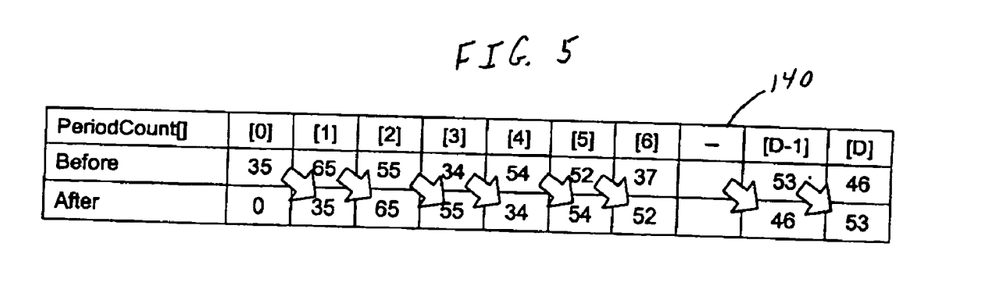
FIG. 5 shows 'before' and 'after' views of a department management table with respect to a priority change opportunity.

FIG. 5 shows a 'before' and 'after' view of the pertinent columns of the Document Management Table 140 as a result of performing a department information update. In FIG. 5, the arrows signify the movement of 'period count' data within the Document Management Table 140.

As explained above, the count value is stored in the PeriodCount columns of the Document Management Table 140 per each priority change opportunity. For example, if the Priority Change Opportunity is one (1) day, then: $0^{th}$ column=Counter value of the $1^{st}$ day (current day); $1^{st}$ column=Counter value of the day before the $1^{st}$ day, $2^{nd}$ column=Counter value of the day before the $2^{nd}$ day, . . . , Dth column=Counter value of the day before the Dth day. Thus, if the "Criteria Period" is 3 days and the "Criteria Number of Sheets" is 100 sheets, when reviewing priority, the "Criteria Number of Sheets" value 100 is compared with the sum of the $0^{th}$, $1^{st}$, and $2^{nd}$ (3 days) counters in the Document Management Table 140.

Figure 6:
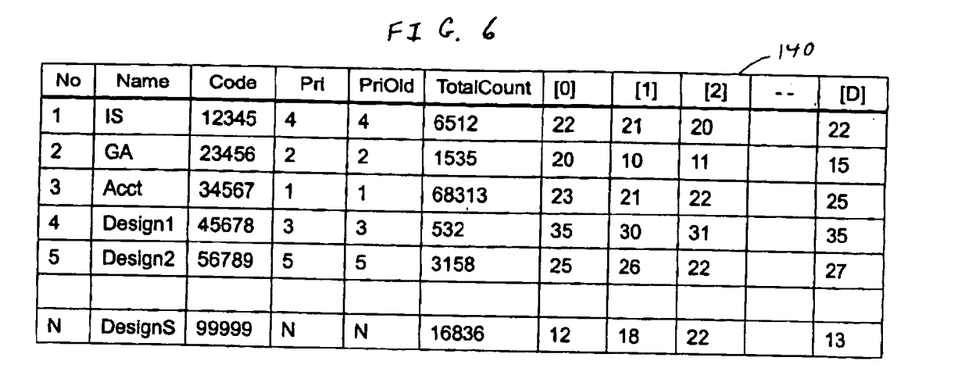
FIG. 6 shows a department management table populated with data with respect to an example that is described in the application.
Figure 7:
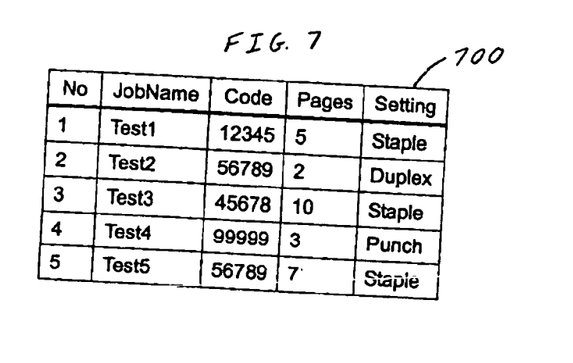
FIG. 7 shows a print job status table populated with data with respect to the example that is described in the application.

To aid in the understanding of the first embodiment of the invention, an example is provided below. In this example, the "Criteria Number of Sheets" is 100, the "Criteria Period" is 3 (three) days, and the "Priority Change Opportunity" is 1 (one) day. For this example, the Department Management Table 140 has the data as shown in FIG. 6. Also, the status of the current print jobs that are currently stored in a print queue 700 is as shown in FIG. 7.

In a first print processing step, there is performed a search for a print job with highest priority with reference to the department code of each print job. A print job in the current print jobs queue of FIG. 7 is selected with the highest priority based on the priorities assigned for the departments as obtained from the Department Management Table 140. In this example, the print job of the department code "45678" (No. 3) is the print job with the highest priority.

Figure 8:
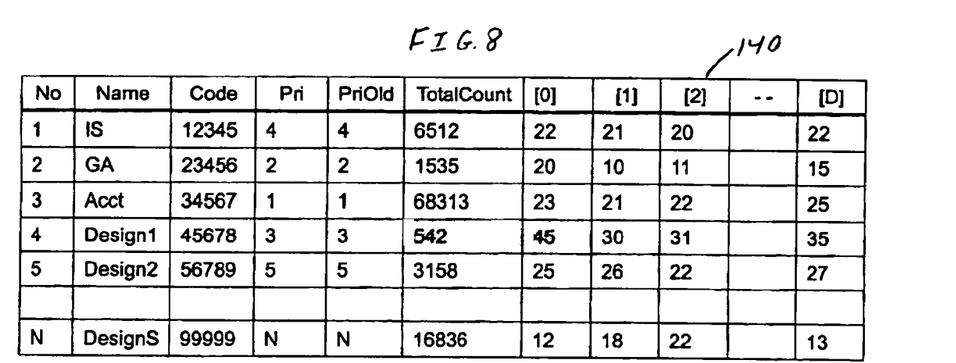
FIG. 8 shows a department management table according to the example in which it has been updated based on a current print job that was just printed.

The print job with the highest priority is printed, and a process is performed of updating the counter of the department of the printed job. That is, the number of pages printed for the job is counted. In this example, the current job that was printed is the No. 3 job of the No. 4 department (Design1) in the Department Management Table 140. The printed number of pages, 10, is respectively added to the TotalCount value and the PeriodCount[0] value of the No. 4 department, and the Department Management Table 140 is updated accordingly. FIG. 8 shows the updated Department Management Table 140. The TotalCount value is not directly related to the print priority scheme according to the first embodiment, but rather is provided for accounting purposes.

In addition to updating the Department Management Table 140, the priority for the department of the current print job is reviewed. That is, a search is performed for the department of the printed job. In the example, that department corresponds to the No. 4 department (Design1). The search is performed based on the job department code ("45678") for the printed job. Next, the count for the "criteria period" is calculated from the PeriodCount[ ] of the department of the current print job. By calculating the count of "criteria period" for three days for the No. 4 department (Design1), the total becomes 106, i.e., PeriodCount[0]+PeriodCount[1]+PeriodCount[2]=45+30+31=106.

Next, the count for "criteria period" is compared to determine if it exceeds "criteria number of sheets." If the count for "criteria period" does not exceed "criteria number of sheets," the priority for the subject department (No. 4 department) is not changed. If the count for "criteria period" exceeds "criteria number of sheets," the priority is changed for the subject department. In this example, the count for three days of "criteria period" (106) is compared with "criteria number of sheets" (100), and since the count for "criteria period" exceeds the "criteria number of sheets," the priority of the subject department may be lowered.

Figure 9:
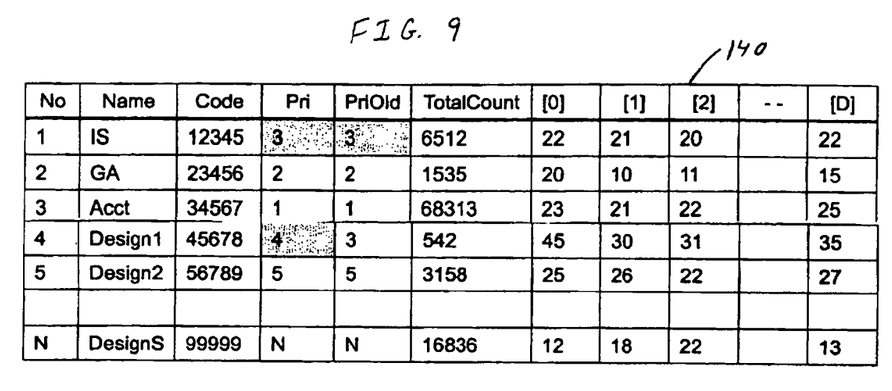
FIG. 9 shows the department management table according to the example after the priority of the subject department has been lowered.

Before lowering the priority, the present priority of the subject department is compared to the old priority of the subject department to determine if they are the same. In order to check whether the priority has already been lowered during the period of "priority change opportunity," the present priority value of the subject department is compared to the old priority value of the subject department. If the priorities are the same, then that means that the priority of the subject department has not been previously lowered during this current "priority change opportunity" period, and thus the priority is lowered. If the priorities are not the same, then that means that the priority of the subject department has already been lowered during this current "priority change opportunity" period, and thus the priority is not lowered. In this example, the old priority "PriOld" and the present priority "Pri" are the same, i.e., both are 3 (three). This means that the priority of the subject department (No. 4) has not been lowered during the "priority change opportunity." Accordingly, the priority is lowered to a "4" value. FIG. 9 shows the Department Management Table 140 after the priority of the subject department has been lowered from '3' to '4'.

The priority of the subject department that had its priority lowered is exchanged with the department having a one lower priority value. In this example, the priority of the No. 4 department (Design1) is changed from 3 to 4, and the priority of the No. 1 department (IS), which previously had priority equal to 4, has its priority increased to 3. In addition, as seen in FIG. 9, the old priority value of the No. 1 department (IS) is set to 3 to make it subject to lowering of its priority. Since the priority of the No. 4 department is 4 and the old priority is 3, the priority of the No. 4 department will not be lowered anymore during the period of the current "priority change opportunity." Lastly, the data of the printed job is deleted, and processing is started for the next print job to be printed.

With respect to the same example discussed above for print processing steps, department information updating will be described below. Department information updating is the processing that is performed at the start time of each "priority change opportunity." In this updating, the value of Period-Count[ ] is replaced with the arrangement for the new subject "criteria period" by shifting data in the Department Management Table 140.

Figure 10:
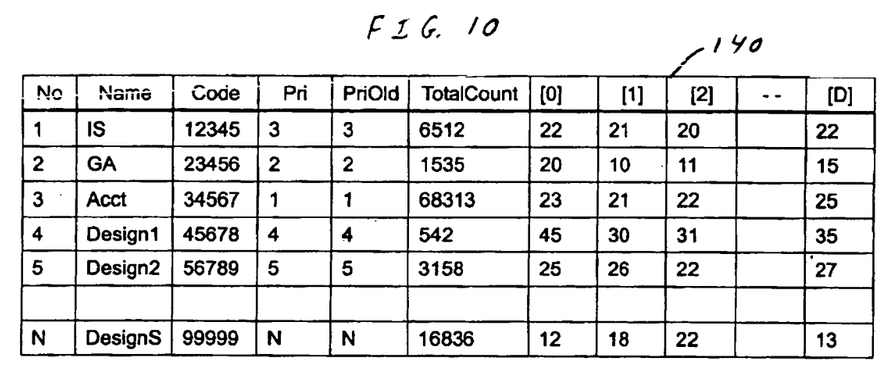
FIG. 10 shows the department management table according to the example after department information updating of priority values has been performed.

In the department information updating process, the following steps described below are repeated for each department (No. 1 through No. 4). First, the old priority (PriOld) is equated to the present priority (Pri) to make each department subject to priority change. FIG. 10 shows the Department Management Table 140 for this example after this step has taken place. In particular, the PriOld value for Design1 department is changed to "4" from its previous value of "3."

Figure 11:
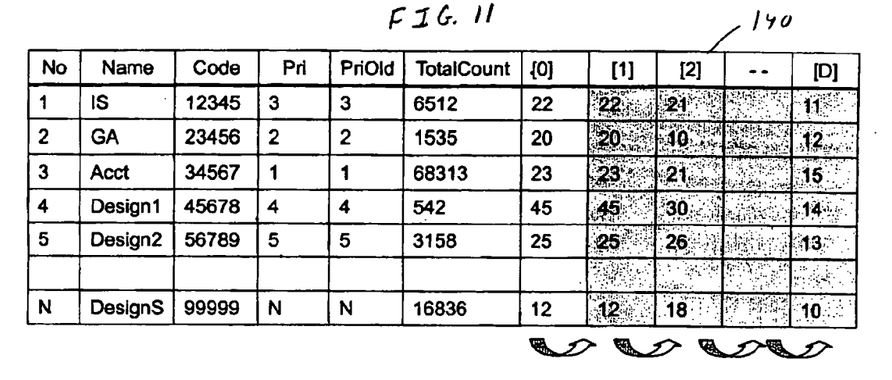
FIG. 11 shows the department management table according to the example while department information updating of period count values is being performed.

The data of PeriodCount[0] through PeriodCount[N] is shifted by one, and preparation for a new count is ready for execution. FIG. 11 shows the Department Management Table 140 for this example after this step has taken place. Arrows are also provided to show where data has been shifted from and is shifted to.

In particular, when the period of a "priority change opportunity" has ended, the following processings are performed in the Department Management Table 140:
Move the value of D–[1] to the column D.
. . .
Move the value of [1] (counter one day before current day) to column [2].
Move the value of [0] (current day counter) to the column [1].
As a result of this step, data in the 'period count' columns of the Document Management Table 140 are moved to adjacent columns as shown by the arrows in FIG. 11.

Figure 12:
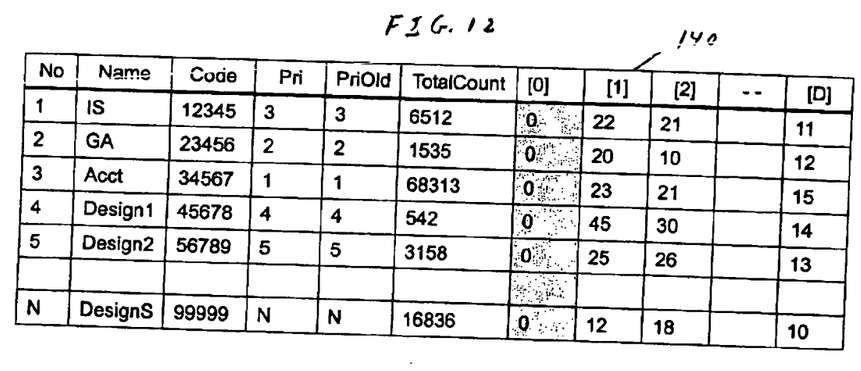
FIG. 12 shows the department management table according to the example after department information updating of period count values has been performed.

The department information updating process also sets the value of the PeriodCount[0] column to zero (0) for each department in the Department Management Table 140 for the new day. FIG. 12 shows this by way of the "[0]" Period Count column in the Document Management Table 140 being zeroed out.

In a second embodiment of the invention, instead of using a quantity of the printed number of sheets to determine whether or not to change a priority for a department, the total number of jobs executed for a "criteria period" is calculated and compared to a printed job count value. In this case, the priority for a department is changed at a priority change opportunity if that department has printed many jobs (e.g., equal to or greater than the printed job count value) in a fixed period of time (e.g., 3 days). All other aspects of the second embodiment are the same as those discussed above with respect to the first embodiment except that the PeriodCount[ ] columns store counts corresponding to jobs printed by each department during a corresponding 'criteria period'.

In a third embodiment of the invention, instead of storing both the old priority and the new priority in the Department Management Table 140, a priority flag may be provided for each department. In this case, the flag is set to a value (e.g., "1") the first time the priority is lowered during a "criteria period," and once the flag is set, it cannot be lowered any more during that "priority change opportunity." In other words, after each print job has been printed, and the Department Management Table 140 is updated accordingly, the flag is checked for the subject department of the most recently printed job to see if it is set or not. In the third embodiment, the old priority value can be used as a reset value for priority under certain conditions, such as when all departments exceed their limit for a "priority change opportunity." That is, if all departments exceed their print limit in a "priority change opportunity" period, the priorities of all of the departments are reset to the values that each department had at the beginning of the "priority change opportunity" period. In an alternative implementation of this feature, if a certain percentage of the departments (e.g., 70%, 80%) exceed their print limit during a "priority change opportunity" period, then the priorities of all of the departments are reset to the values that each department had at the beginning of the "priority change opportunity" period.

In a fourth embodiment of the invention, there is provided a "demand time" feature in which print jobs performed during a peak demand time, such as between 10:00 a.m. and 3:00 p.m., count more against a department than print jobs performed during off-peak times. For example, each print job performed during the peak demand time may count as two print jobs in the second embodiment, or each print job performed during the peak demand time may have its printed number of pages doubled in the first embodiment. As a result, users will be penalized more for print jobs performed at times when others are likely to use printers, thereby encouraging printer use at all times of the day.

The foregoing description of preferred embodiments of the invention has been presented for purposes of illustration and description. It is not intended to be exhaustive or to limit the invention to the precise form disclosed, and modifications and variations are possible in light in the above teachings or may be acquired from practice of the invention. For example, while the term "department" has been described with respect to departments of a company, that term can be used to refer to each person that is assigned to a particular printer or printers, and/or each company that may share a printer or printers in a system that allows different companies to print to a same printer or a same set of printers (e.g., tele-work center). The embodiments (which can be practiced separately or in combination) were chosen and described in order to explain the principles of the invention and as practical application to enable one skilled in the art to utilize the invention in various embodiments and with various modifications are suited to the particular use contemplated. It is intended that the scope of the invention be defined by the claims appended hereto and their equivalents.

What is claimed is:

1. A method of providing a level of priority for printing a document in a company having a plurality of departments, comprising:

receiving, by a printer system, a print job for printing at least one document;

determining, by the printer system, a department from the plurality of departments which sent the print job, and assigning a priority to the print job based on the determined department;

after the print job has been printed, determining, by the printer system, a print amount from the determined department during a fixed time interval;

lowering, by the printer system, the priority assigned to the determined department if the print amount exceeds a threshold value; and periodically performing, by the printer system, a priority level update for each of the departments, based on the print amount for the corresponding departments during the fixed time interval, the print amount corresponding to either a total number of printed sheets or a total number of print jobs during the fixed time interval, in a case in which the print amount corresponds to the total number of printed sheets during the fixed time interval:
  determining, by the printer system, a time of day when the print job was printed; and
  if the print job was printed during a particular time of day, assigning, by the printer system, a positive demand time value of more than one to be multiplied by a print sheet value that corresponds to the total number of printed sheets of the print job, to thereby compute an updated print amount for the print job, to be added to a print sheet value that corresponds to a total number of printed sheets made by respective print jobs of the determined department during the fixed time interval,
in a case in which the print amount corresponds to the total number of print jobs during the fixed time interval:
  if the print job was printed during the particular time of day, assigning, by the printer system, the positive demand time value of more than one that is added to the total number of print jobs previously made by the determined department during the fixed time interval, to obtain an updated total number of print jobs made by the determined department during the fixed time interval.

2. The method according to claim 1, wherein the fixed time interval corresponds to a time interval starting at a first time and ending at a second time, the first time being previous to the second time.

3. The method according to claim 1, further comprising:
  receiving, through a display portion, a value for the fixed time interval.

4. The method according to claim 1, wherein each print job includes a department identification code, and wherein the determining step comprises:
  comparing the department identification code of the print job with a plurality of stored department identification codes to determine the department from which the print job was sent.

5. The method according to claim 1, wherein the lowering step includes, if the print amount exceeds the threshold value, lowering the priority assigned to the determined department to a priority level of another department that was previously at a priority level immediately lower than the determined department during a previous time interval.

6. A system for printing documents, comprising:
  a receiving unit configured to receive a print job for printing at least one document;
  a determining unit configured to determine a department from the plurality of departments which sent the print job, and to assign a priority to the print job based on the determined department;
  a control unit configured to determine, after the print job has been printed, a print amount from the determined department during a fixed time interval,
  the control unit being configured to lower the priority assigned to the determined department if the print amount exceeds a threshold value, and
  the determining unit being configured to periodically perform a priority level update for each of the departments, based on the print amount for the corresponding departments during the fixed time interval,
  in a case in which the determining unit determines that more than a fixed percentage of the plurality of departments have a respective print amount that exceeds the threshold value for the fixed time interval, the respective priority levels of all of the plurality of departments are maintained for a next time interval that is the same as the respective priority levels of the plurality of departments for a most recent time interval just prior to the fixed time interval.

7. The system according to claim 6, wherein the fixed time interval corresponds to a time interval starting at a first time and ending at a second time, the first time being previous to the second time.

8. The system according to claim 6, further comprising:
  a display portion for receiving a user input value corresponding to the fixed time interval.

9. The system according to claim 7, wherein each print job includes a department identification code, and wherein the determining unit comprises:
  a comparing unit for comparing the department identification code of the print job with a plurality of stored department identification codes, to determine the department from which the print job was sent.

10. A computer readable storage device configured to store a program product for printing a document, the program product comprising machine-readable program code for causing, when executed, one or more machines to perform the following method steps comprising:
  receiving a print job for printing at least one document;
  determining a department from the plurality of departments which sent the print job, and assigning a priority to the print job based on the determined department;
  after the print job has been printed, determining a print amount from the determined department during a fixed time interval;
  lowering the priority assigned to the determined department if the print amount exceeds a threshold value; and
  periodically performing a priority level update for each of the departments, based on the print amount for the corresponding departments during the fixed time interval, the print amount corresponding to either a total number of printed sheets or a total number of print jobs during the fixed time interval,
  in a case in which the print amount corresponds to the total number of printed sheets during the fixed time interval:
    determining a time of day when the print job was printed; and
    if the print job was printed during a particular time of day, assigning a positive demand time value of more than one to be multiplied by a print sheet value that corresponds to the total number of printed sheets of the print job, to thereby compute an updated print amount for the print job, to be added to a print sheet value that corresponds to a total number of printed sheets made by respective print jobs of the determined department during the fixed time interval,
  in a case in which the print amount corresponds to the total number of print jobs during the fixed time interval:
    if the print job was printed during the particular time of day, assigning the positive demand time value of more than one that is added to the total number of print jobs previously made by the determined department during the fixed time interval, to obtain an updated total number of print jobs made by the determined department during the fixed time interval.

11. The computer readable storage device according to claim 10, wherein the fixed time interval corresponds to a time interval starting at a first time and ending at a second time, the first time being previous to the second time.

12. The computer readable storage device according to claim 10, further comprising:
  entering, by way of a display portion, a value corresponding to the fixed time interval.

13. The computer readable storage device according to claim 10, wherein each print job includes a department identification code, and wherein the determining step comprises:

comparing the department identification code of the print job with a plurality of stored department identification codes, to determine the department from which the print job was sent.

14. The computer readable storage device according to claim 10, wherein the lowering step lowers the priority assigned to the determined department to a priority level of another department that was previously at a priority level immediately lower than the determined department during a previous time interval, if the print amount exceeds the threshold value.

15. A method of providing a level of priority for printing a document in a company having a plurality of departments, comprising:

receiving, by a printer system, a print job for printing at least one document;

determining, by the printer system, a department from the plurality of departments which sent the print job, and assigning a priority to the print job based on the determined department;

after the print job has been printed, determining, by the printer system, a print amount from the determined department during a fixed time interval;

lowering, by the printer system, the priority assigned to the determined department if the print amount exceeds a threshold value; and periodically performing, by the printer system, a priority level update for each of the departments, based on the print amount for the corresponding departments during the fixed time interval, the lowering step including, if the print amount exceeds the threshold value, lowering. by the printer system, the priority assigned to the determined department to a priority level of another department that was previously at a priority level immediately lower than the determined department during a previous time interval, and if more than a fixed percentage of the plurality of departments have a respective print amount that exceeds the threshold value for the fixed time interval, maintaining, by the printer system, all of the plurality of departments at respective priority levels for a next time interval that is the same as the respective priority levels of the plurality of departments for a most recent time interval just prior to the fixed time interval.

16. A computer readable storage device configured to store a program product for printing a document, the program product comprising machine-readable program code for causing, when executed, one or more machines to perform the following method steps comprising:

receiving a print job for printing at least one document;

determining a department from the plurality of departments which sent the print job, and assigning a priority to the print job based on the determined department;

after the print job has been printed, determining a print amount from the determined department during a fixed time interval;

lowering the priority assigned to the determined department if the print amount exceeds a threshold value; and periodically performing a priority level update for each of the departments, based on the print amount for the corresponding departments during the fixed time interval, the lowering step lowering the priority assigned to the determined department to a priority level of another department that was previously at a priority level immediately lower than the determined department during a previous time interval, if the print amount exceeds the threshold value, and if more than a fixed percentage of the plurality of departments have a respective print amount that exceeds the threshold value for the fixed time interval, maintaining all of the plurality of departments at respective priority levels for a next time interval that is the same as the respective priority levels of the plurality of departments for a most recent time interval just prior to the fixed time interval.

* * * * *